US012200627B2

(12) United States Patent
Chen et al.

(10) Patent No.: US 12,200,627 B2
(45) Date of Patent: Jan. 14, 2025

(54) ENHANCEMENTS ON GROUP COMMON DOWNLINK CONTROL INFORMATION FOR SOUNDING REFERENCE SIGNAL TRIGGERING

(71) Applicant: QUALCOMM Incorporated, San Diego, CA (US)

(72) Inventors: Yitao Chen, San Diego, CA (US); Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 17/710,758

(22) Filed: Mar. 31, 2022

(65) Prior Publication Data

US 2023/0319727 A1  Oct. 5, 2023

(51) Int. Cl.
*H04W 72/23* (2023.01)
*H04L 5/00* (2006.01)
*H04W 52/14* (2009.01)
*H04W 52/32* (2009.01)
*H04W 72/044* (2023.01)

(52) U.S. Cl.
CPC ......... *H04W 52/146* (2013.01); *H04L 5/0051* (2013.01); *H04W 52/325* (2013.01); *H04W 72/044* (2013.01); *H04W 72/23* (2023.01)

(58) Field of Classification Search
CPC ............. H04W 52/143; H04W 52/146; H04W 52/325; H04W 52/346; H04W 72/044; H04W 72/0453; H04W 72/23; H04L 5/001; H04L 5/0051; H04L 5/0098; H04L 25/0224

See application file for complete search history.

(56) References Cited

U.S. PATENT DOCUMENTS

| 11,856,532 | B2* | 12/2023 | Li .......................... H04L 5/0053 |
| 2012/0039273 | A1* | 2/2012 | Nam ................... H04W 52/325 455/450 |
| 2020/0314871 | A1 | 10/2020 | Sun et al. |
| 2022/0045884 | A1* | 2/2022 | Lin ....................... H04W 72/23 |
| 2022/0060356 | A1* | 2/2022 | Taherzadeh Boroujeni ................ H04W 72/0446 |

(Continued)

FOREIGN PATENT DOCUMENTS

WO      2022027217  A1     2/2022

OTHER PUBLICATIONS

International Search Report and Written Opinion—PCT/US2023/064109—ISA/EPO—Jun. 16, 2023.

*Primary Examiner* — Jean A Gelin

(74) *Attorney, Agent, or Firm* — QUALCOMM Incorporated

(57) ABSTRACT

Certain aspects of the present disclosure provide techniques for method for wireless communications by a user equipment (UE). The method generally includes receiving a group-common downlink control information (GC-DCI) of a format that has multiple blocks that allow for triggering sounding reference signal (SRS) transmissions on one or more component carriers (CCs) with transmit power control (TPC) independent of TPC commands for SRS, determining, based on one of the blocks, one or more SRS parameters for transmitting SRS on at least a first CC, and transmitting SRS on at least the first CC in accordance with SRS parameters.

27 Claims, 17 Drawing Sheets

(56) References Cited

U.S. PATENT DOCUMENTS

| | | | |
|---|---|---|---|
| 2023/0034070 A1* | 2/2023 | Dai | H04W 72/20 |
| 2023/0128924 A1* | 4/2023 | Ganesan | H04W 74/0816 |
| | | | 370/329 |
| 2023/0232339 A1* | 7/2023 | Fakoorian | H04W 52/325 |
| | | | 455/522 |
| 2023/0319885 A1* | 10/2023 | Bagheri | H04L 1/1819 |
| | | | 370/329 |
| 2023/0345206 A1* | 10/2023 | Beale | H04W 4/029 |
| 2024/0146425 A1* | 5/2024 | Fakoorian | H04W 76/20 |

* cited by examiner

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' |
|---|---|
| 00 | No aperiodic SRS resource set triggered |
| 01 | SRS resource set(s) configured with higher layer parameter aperiodicSRS-ResourceTrigger set to 1 or an entry in aperiodicSRS-ResourceTriggerList set to 1 |
| 10 | SRS resource set(s) configured with higher layer parameter aperiodicSRS-ResourceTrigger set to 2 or an entry in aperiodicSRS-ResourceTriggerList set to 2 |
| 11 | SRS resource set(s) configured with higher layer parameter aperiodicSRS-ResourceTrigger set to 3 or an entry in aperiodicSRS-ResourceTriggerList set to 3 |

*FIG. 5A*

| A/D | SRS Resource Set's Cell ID | SRS Resource Set's BWP ID | | | Oct 1 |
|---|---|---|---|---|---|
| R | R | C | SUL | SP SRS Resource Set ID | Oct 2 |

*FIG. 5B*

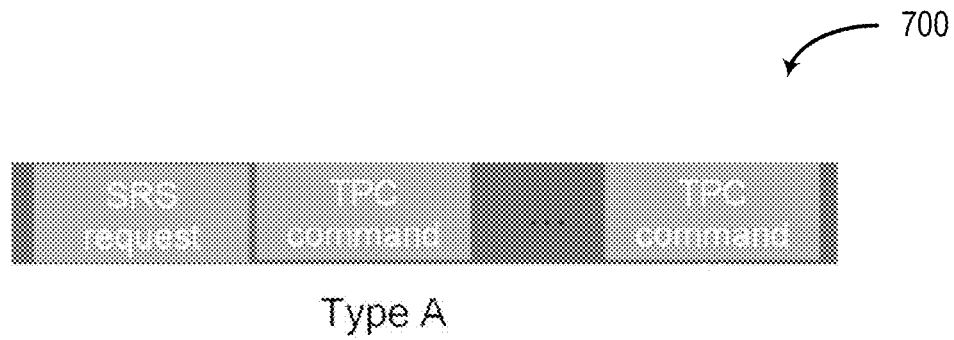
Type A
FIG. 7A
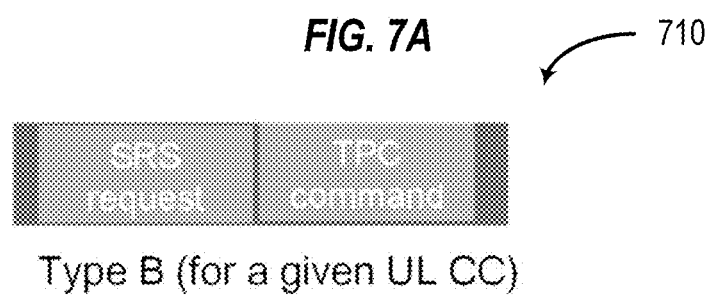
Type B (for a given UL CC)
FIG. 7B
| TPC Command Field | Accumulated $\delta_{PUSCH,b,f,c}$ or $\delta_{SRS,b,f,c}$ [dB] |
|---|---|
| 0 | -1 |
| 1 | 0 |
| 2 | 1 |
| 3 | 3 |
FIG. 7C

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 00 | No aperiodic SRS resource set triggered | No aperiodic SRS resource set triggered |
| 01 | SRS resource set(s) configured by SRS-ResourceSet with higher layer parameter aperiodicSRS-ResourceTrigger set to 1 or an entry in aperiodicSRS-ResourceTriggerList set to 1 | SRS resource set(s) configured with higher layer parameter usage in SRS-ResourceSet set to 'antennaSwitching' and resourceType in SRS-ResourceSet set to 'aperiodic' for a 1st set of serving cells configured by higher layers |
| 10 | SRS resource set(s) configured by SRS-ResourceSet with higher layer parameter aperiodicSRS-ResourceTrigger set to 2 or an entry in aperiodicSRS-ResourceTriggerList set to 2 | SRS resource set(s) configured with higher layer parameter usage in SRS-ResourceSet set to 'antennaSwitching' and resourceType in SRS-ResourceSet set to 'aperiodic' for a 2nd set of serving cells configured by higher layers |
| 11 | SRS resource set(s) configured by SRS-ResourceSet with higher layer parameter aperiodicSRS-ResourceTrigger set to 3 or an entry in aperiodicSRS-ResourceTriggerList set to 3 | SRS resource set(s) configured with higher layer parameter usage in SRS-ResourceSet set to 'antennaSwitching' and resourceType in SRS-ResourceSet set to 'aperiodic' for a 3rd set of serving cells configured by higher layers |

FIG. 8

Payload of the GC-DCI

One block: UE 1, 2, 3, and 4 are configured with this block

ENHANCEMENTS ON GROUP COMMON DOWNLINK CONTROL INFORMATION FOR SOUNDING REFERENCE SIGNAL TRIGGERING

BACKGROUND

Field of the Disclosure

Aspects of the present disclosure relate to wireless communications, and more particularly, to techniques for triggering sounding reference signal (SRS) transmissions from multiple user equipments (UEs).

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communications by a user equipment (UE). The method includes receiving a group-common downlink control information (GC-DCI) of a format that has multiple blocks that allow for triggering sounding reference signal (SRS) transmissions on one or more component carriers (CCs) with transmit power control (TPC) independent of TPC commands for SRS; determining, based on one of the blocks, one or more SRS parameters for transmitting SRS on at least a first CC; and transmitting SRS on at least the first CC in accordance with SRS parameters.

Another aspect provides a method of wireless communications by a network entity. The method includes transmitting a GC-DCI of a format that has multiple blocks that allow for triggering SRS transmissions, by one or more UEs, on one or more CCs with TPC independent of TPC commands for SRS; and monitoring for SRS transmissions sent in accordance with SRS parameters indicated by the blocks in the GC-DCI.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 5A and FIG. 5B depict an SRS request field format and an SRS medium access control (MAC) control element (CE).

FIG. 7A, FIG. 7B and FIG. 7C depict example GC-DCI block field types.

FIG. 8 depicts an SRS request field format corresponding to different GC-DCI block field types.

Figures 12A, 12B, 12C, 12D:
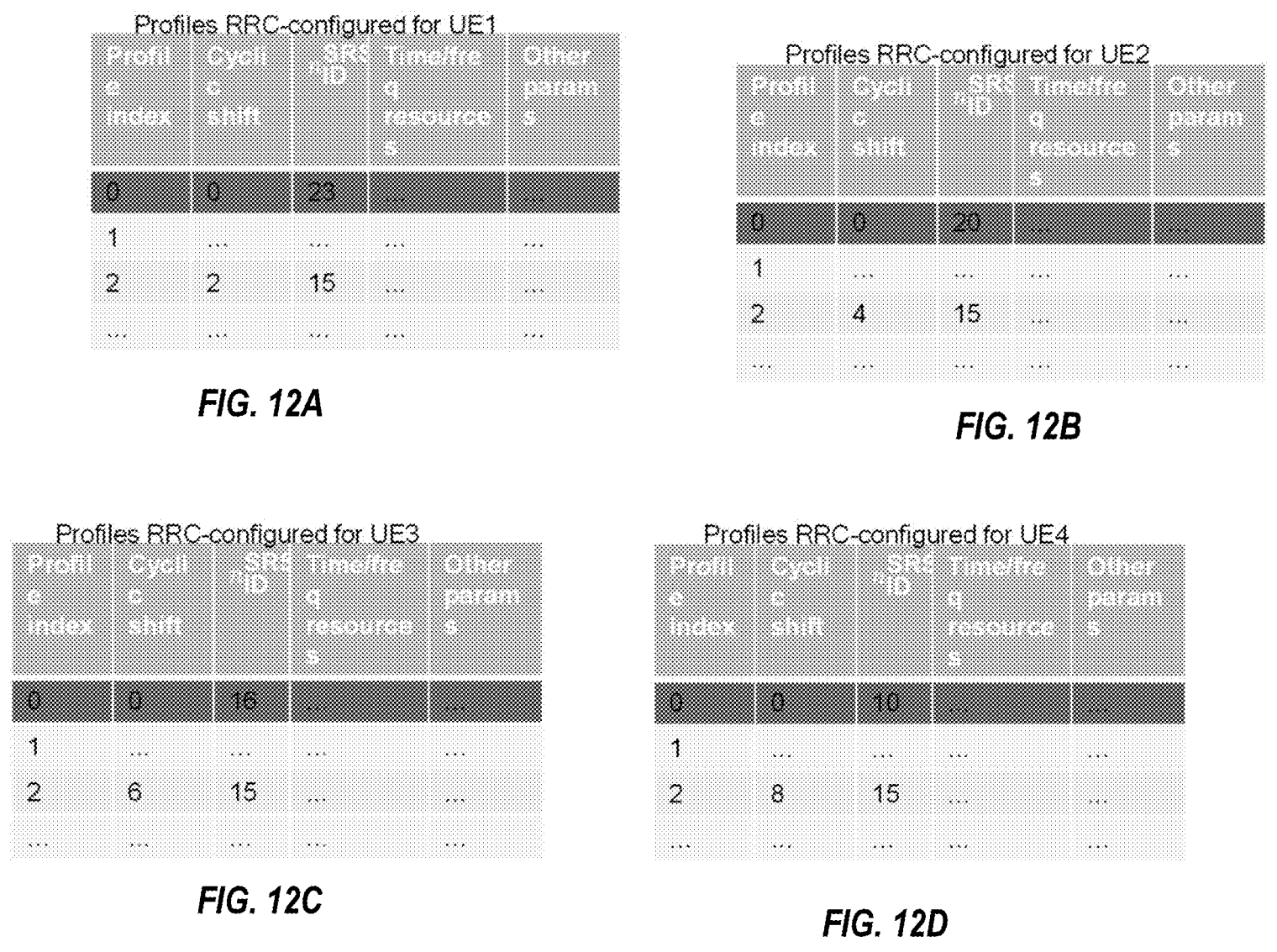

FIG. 12A, FIG. 12B, FIG. 12C, and FIG. 12D depicts example SRS configuration profiles, in accordance with aspects of the present disclosure.

DETAILED DESCRIPTION

Figure 1:
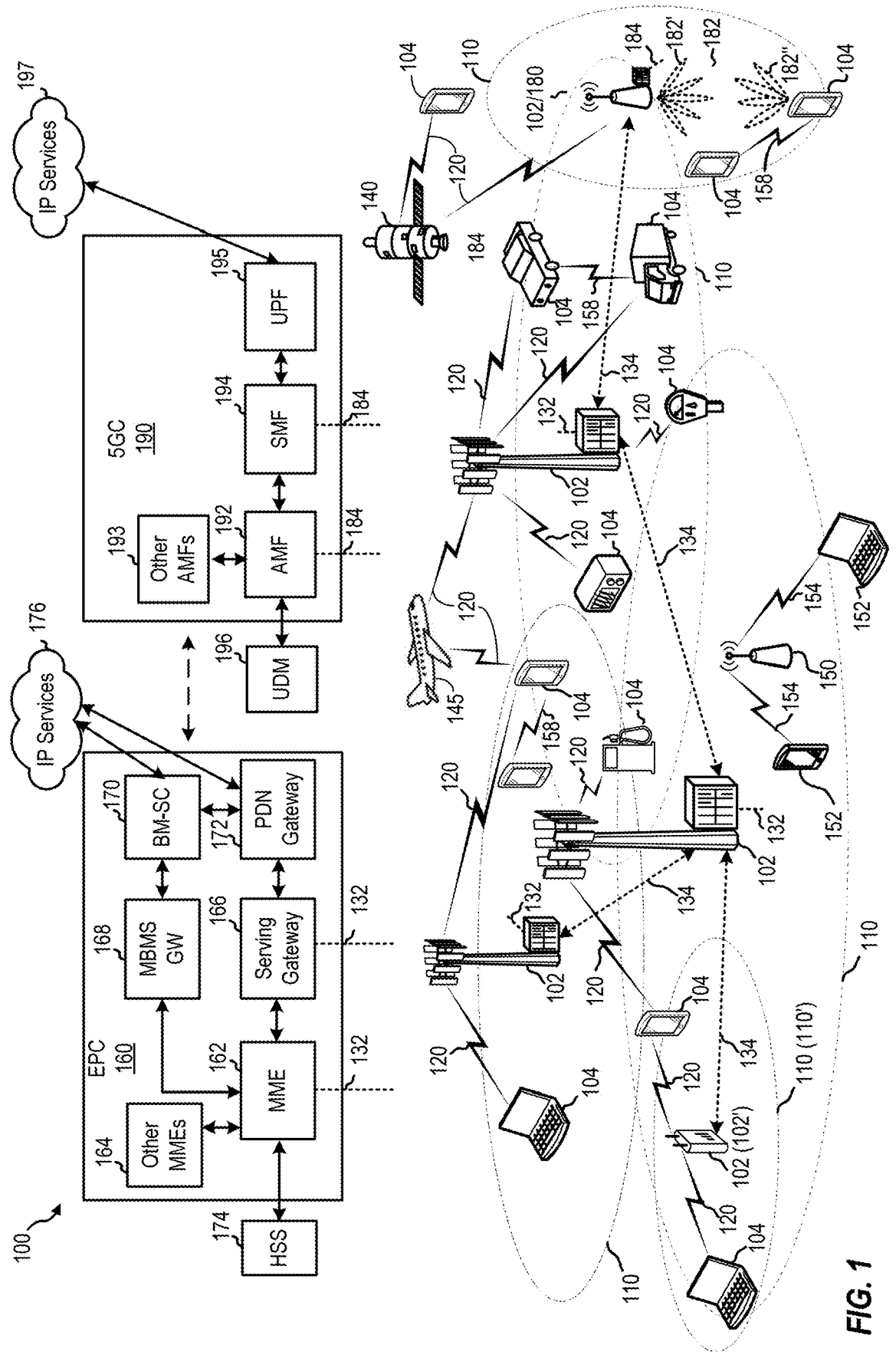
FIG. 1 depicts an example wireless communications network.

Aspects of the present disclosure provide apparatuses, methods, processing systems, and computer-readable mediums for triggering sounding reference signal (SRS) transmissions from multiple user equipments (UEs).

A UE may be configured to transmit SRS on SRS resources. SRS resources are configured within an SRS resource set consisting of one or more SRS resources. Each SRS resource set configuration can indicate a resource type as aperiodic, semi-persistent, or periodic. This configuration mechanism basically simplifies the activation (for semi-persistent SRS transmissions) and for downlink control information (DCI) triggering (for aperiodic SRS transmissions) since multiple resources can be activated/triggered simultaneously.

A semi-persistent SRS (SP SRS) resource set is activated or deactivated by MAC-CE. Once activated, the SRS resources within the set (indicated by the SP SRS Resource Set ID) are transmitted periodically (based on periodicity and offset RRC parameters) until another MAC-CE deactivates the SP SRS resource set. Periodic SRS (P SRS) is configured by RRC. Once configured, the SRS resources within the set are transmitted periodically (based on periodicity and offset RRC parameters).

Aperiodic SRS (AP SRS) can be triggered with different DCI formats, including DL DCI formats (1_1 or 1_2) or UL DCI formats (0_1 or 0_2) or DCI format (2_3). An SRS request field of these DCI indicates one or more SRS resource sets. mapping between SRS resource sets and the SRS request codepoints (i.e., 01, 10, 11) is given by RRC configuration (aperiodicSRS-ResourceTrigger or aperiodicSRS-ResourceTriggerList).

DCI format 2_3 is a group common DCI (GC-DCI) with a cyclic redundancy check (CRS) scrambled with a transmit power control (TPC) SRS radio network temporary identifier (RNTI). GC-DCI format 2_3 includes multiple blocks of SRS parameters, where each UE is configured with a starting position of a corresponding block.

Currently, AP-SRS triggering from multiple UEs via GC-DCI is limited by certain constraints. For example, GC-DCI triggered AP-SRS is currently only applicable to uplink UL component carriers (CCs) in which physical uplink shared channel (PUSCH) transmissions are not configured (e.g., UL CCs used for SRS carrier switching) or in the case that power control for SRS is independent of power control for PUSCH.

These limitations on GC-DCI AP-SRS triggering may present challenges in certain used cases for SRS. For example, coherent joint transmission (CJT) scenarios, SRS transmission from one UE may be received by multiple TRPs, and the estimated channel is used for joint precoding on DL. With joint precoding (e.g. zero-forcing beamforming), multiple UEs can be served on the same resources (e.g., on the same symbols/resource blocks-RBs) as inter-UE interference can be minimized using joint precoding techniques.

Such applications could benefit from triggering SRS for multiple UEs at the same time using GC-DCI to acquire the channel, but SRS parameters would need to be assigned carefully to minimize inter-UE interference at each TRP (so that each TRP can estimate the channel to each UE based on reception of the corresponding SRS from that UE).

The current constraints on GC-DCI triggering of SRS for multiple UEs makes GC-DCI triggering less than ideal. The current constraint is acceptable in current applications where the main purpose of DCI format 2_3 is for transmit power control (TPC) indication, but does not currently allow for SRS triggering using GC-DCI without separate closed loop power control. This results in unnecessary overhead, as GC-DCI includes TPC fields (2-bit fields), even if closed loop power change is not needed at the time of SRS triggering. Further, currently, the SRS request has only two bits indicating one of three possibilities to trigger a subset of SRS resource sets, which may limit flexibility.

Further, the current GC-DCI structure is far from optimized for the CJT use case above as SRS parameters cannot be dynamically indicated by the DCI resulting in low flexibility. The SRS triggering is a one-time request resulting in one instance of AP-SRS transmission, but triggering periodic SRS transmission by GC-DCI is not currently possible.

Aspects of the present disclosure provide more flexible GC-DCI based SRS triggering. For example, aspects of the present disclosure provide a GC-DCI format that has multiple blocks that allow for triggering of SRS transmissions on one or more UL CCs with TPC independent of TPC commands for SRS. In such cases, SRS power control may follow PUSCH power control, meaning the GC-DCI may not have the overhead of unnecessary TPC command fields. Further, certain GC-DCI formats presented herein may have flexible block sizes to accommodate for flexible SRS configurations and, in some cases, may be used to trigger periodic SRS.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
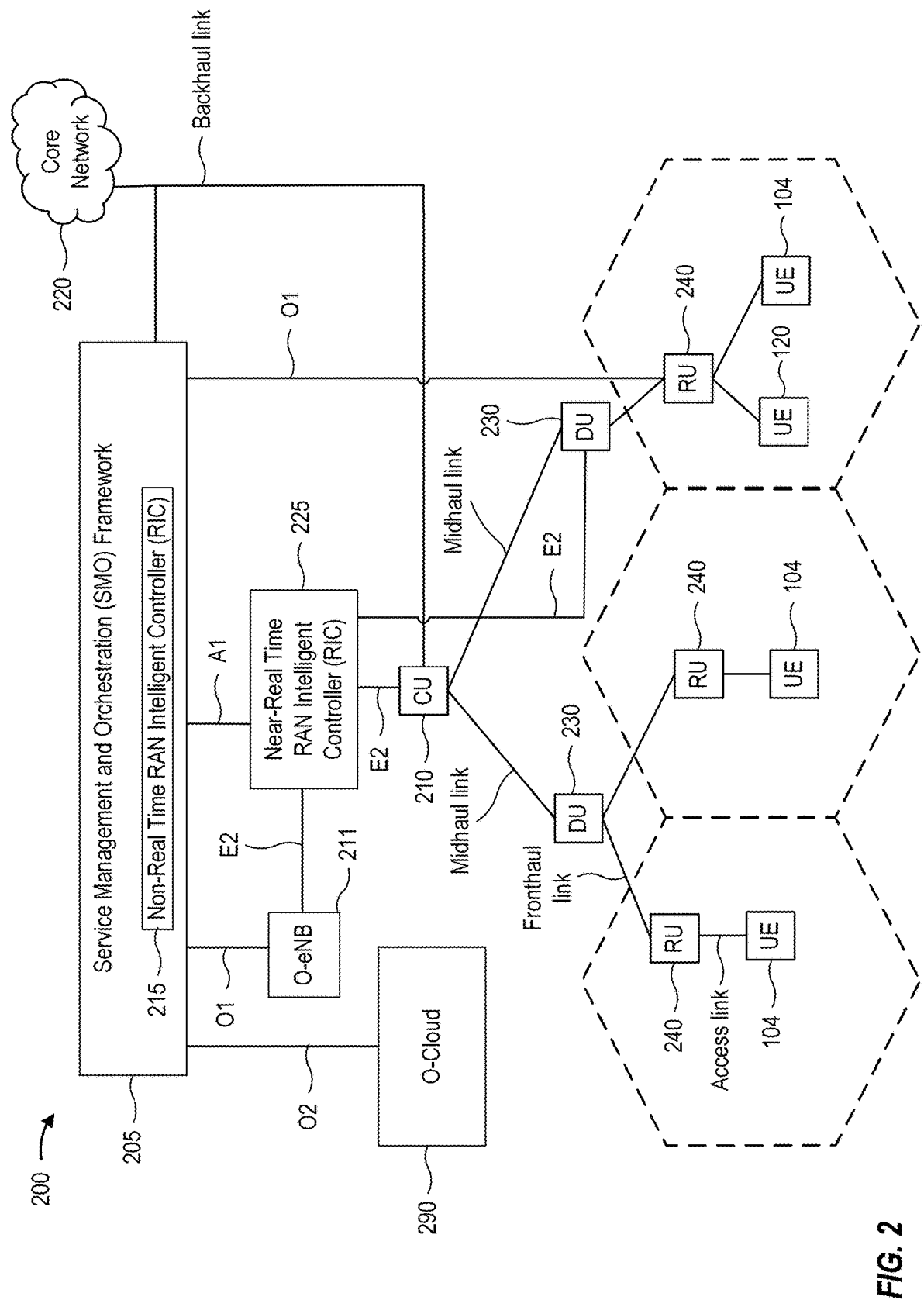
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5GNR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit—User Plane (CU-UP)), control plane functionality (e.g., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
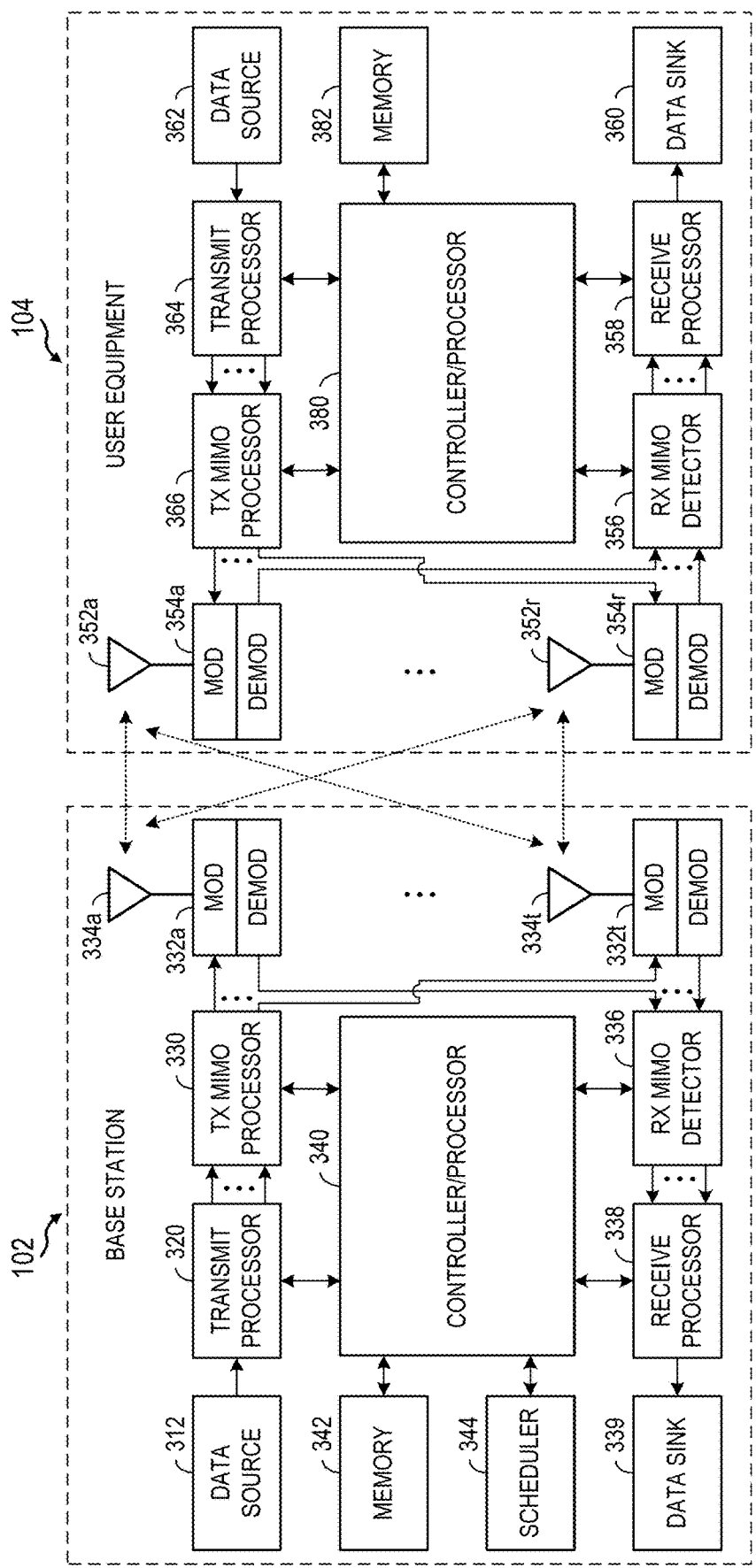
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
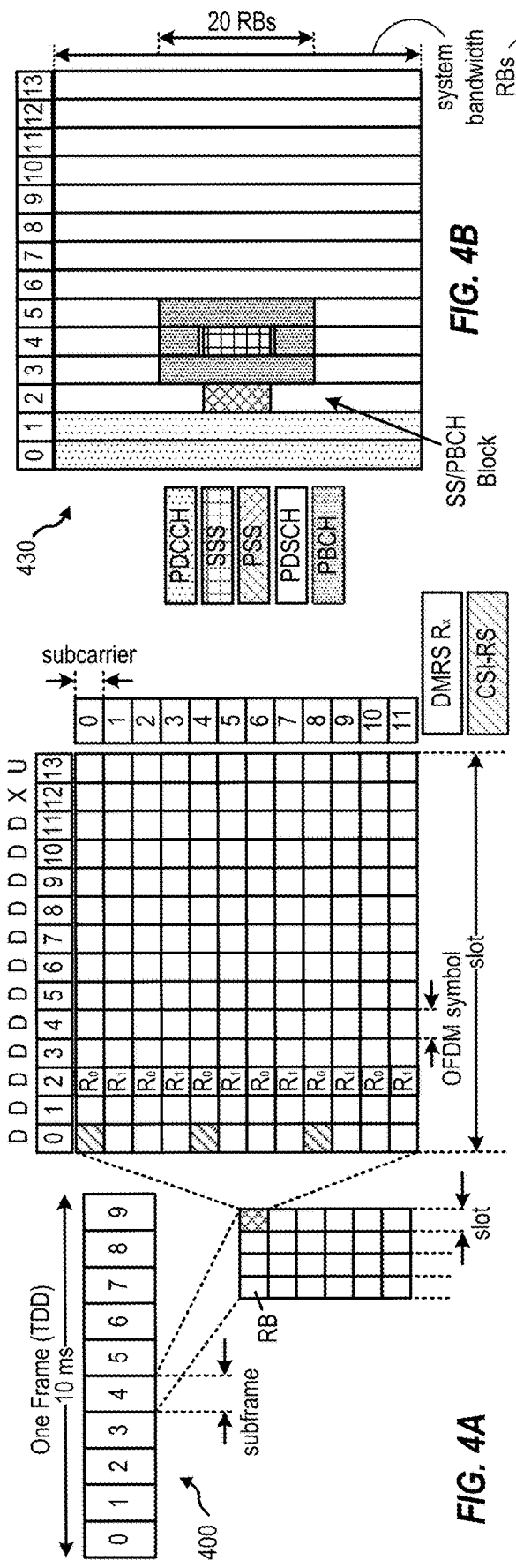
FIGS. 4A, 4B, 4C, and 4D depict various example aspects of data structures for a wireless communications network.

In particular, FIG. 4A is a diagram 400 illustrating an example of a first subframe within a 5G (e.g., 5GNNR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of SRS Configuration, Types, and Triggering

As noted above, each SRS resource set configuration can indicate a resource type as aperiodic, semi-persistent, or periodic.

A semi-persistent SRS (SP SRS) resource set is activated or deactivated by MAC-CE, such as the MAC-CE 510 shown in FIG. 5B. Once activated, the SRS resources within the set (indicated by the SP SRS Resource Set ID) are transmitted periodically (based on periodicity and offset RRC parameters) until another MAC-CE deactivates the SP SRS resource set. Periodic SRS (P SRS) is configured by RRC. Once configured, the SRS resources within the set are transmitted periodically (based on periodicity and offset RRC parameters).

Aperiodic SRS (AP SRS) can be triggered with different DCI formats, including DL DCI formats (1_1 or 1_2) or UL DCI formats (0_1 or 0_2) or DCI format (2_3). An SRS request field of these DCI indicates one or more SRS resource sets. mapping between SRS resource sets and the SRS request codepoints (i.e., 01, 10, 11) is given by RRC configuration (aperiodicSRS-ResourceTrigger or aperiodicSRS-ResourceTriggerList), as illustrated in table 500 of FIG. 5A.

Figure 6:
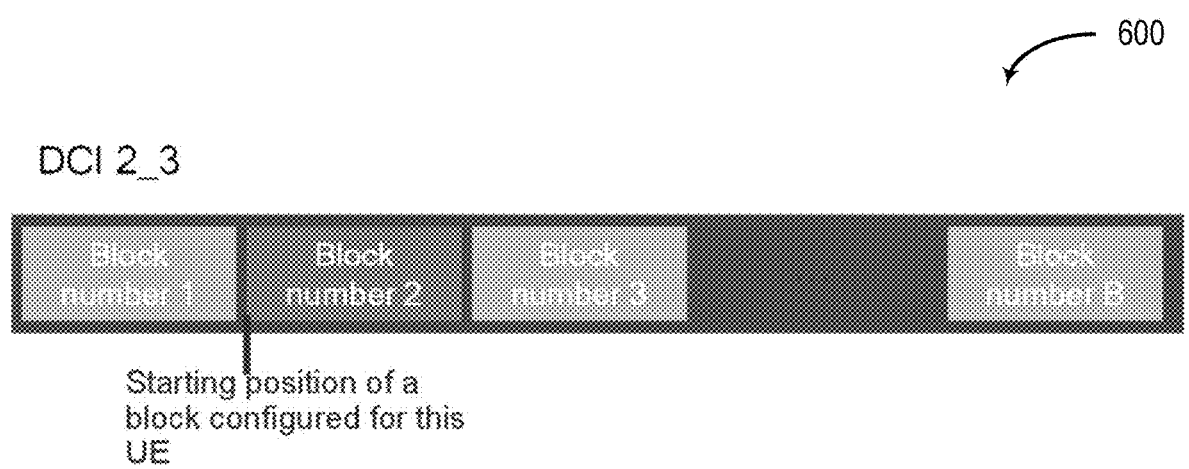
FIG. 6 depicts an example groupcast downlink control information (GC-DCI) block format.

DCI format 2_3 is a group common DCI (GC-DCI) with a cyclic redundancy check (CRS) scrambled with a transmit power control (TPC) SRS radio network temporary identifier (RNTI). As illustrated in FIG. 6, GC-DCI format 2_3 includes multiple blocks 600 of SRS parameters, where each UE is configured with a starting position of a corresponding block.

The content (payload size/fields) of a block depends on whether an SRS request field is included or not (which can be configured optionally by RRC parameter "fieldTypeFormat2-3" (and has 2 bits if configured) and whether a type, whether type A or type B (configured by srs-TPC-PDCCH-Group). As illustrated in FIG. 7B, for type B, each block 710 has an SRS request field (0 or 2 bits) and a TPC command field (2 bits). For type B, a UE can be configured with multiple blocks for different UL CCs. As illustrated in FIG. 7A, for type A, each block 700 may have an SRS request field (0 or 2 bits) and N TPC command fields (2 bits each, for a total of 2*N bits) corresponding to different UL CCs. With type A, only one block can be configured for the UE.

As illustrated in table 800 of FIG. 8, for type B, a mapping between SRS resource sets and the SRS request codepoints (i.e., 01, 10, 11) is given as part of aperiodicSRS-ResourceTrigger or aperiodicSRS-ResourceTriggerList as part of SRS resource set configurations. For type A, AP-SRS is triggered for a set of CCs, where three sets of CCs map to the three codepoints and a CC can belong to one or more set of CCs. As illustrated in table 800, when SRS is triggered for a set of CCs, aperiodic SRS resource sets configured with usage='antennaSwitching' in each CC from the set of CC's are triggered.

As noted above, various limitations on GC-DCI AP-SRS triggering may present challenges in certain used cases for SRS. For example, coherent joint transmission (CJT) scenarios, SRS transmission from one UE may be received by multiple TRPs, and the estimated channel is used for joint precoding on DL. With joint precoding (e.g. zero-forcing beamforming), multiple UEs can be served on the same resources (e.g., on the same symbols/resource blocks-RBs) as inter-UE interference can be minimized using joint precoding techniques.

Such applications could benefit from triggering SRS for multiple UEs at the same time using GC-DCI to acquire the channel, but SRS parameters would need to be assigned carefully to minimize inter-UE interference at each TRP (so that each TRP can estimate the channel to each UE based on reception of the corresponding SRS from that UE).

The current constraints on GC-DCI triggering of SRS for multiple UEs makes GC-DCI triggering less than ideal. The current constraint is acceptable in current applications where the main purpose of DCI format 2_3 is for transmit power control (TPC) indication, but does not currently allow for SRS triggering using GC-DCI without separate closed loop power control. This results in unnecessary overhead, as GC-DCI includes TPC fields (2-bit fields as shown in FIG. 7C), even if closed loop power change is not needed at the time of SRS triggering. Further, currently, the SRS request has only two bits indicating one of three possibilities (as illustrated in the table of FIG. 8) to trigger a subset of SRS resource sets.

Further, the current GC-DCI structure is far from optimized for the CJT use case above as SRS parameters cannot be dynamically indicated by the DCI resulting in low flexibility. The SRS triggering is a one-time request resulting in one instance of AP-SRS transmission, but triggering periodic SRS transmission by GC-DCI is not currently possible.

Aspects Related to Enhancements on GC-DCI for SRS Triggering

Aspects of the present disclosure may provide more flexible GC-DCI based SRS triggering. For example, aspects of the present disclosure provide GC-DCI formats that may have various properties that remove some of the limiting constraints described above. GC-DCI with such properties may be identified based on a new DCI format (e.g., a new DCI format 2_x), based on a new RNTI (e.g., an SRS-Request-RNTI), or based on both a new DCI format and a new RNTI. A UE may monitor for such GC-DCI in a common search space (e.g., Type3-CSS).

One example of a new property is a GC-DCI that has multiple blocks that allow for triggering of SRS transmissions on one or more UL CCs with TPC independent of TPC commands for SRS. Rather, SRS power control may follow PUSCH power control, meaning the GC-DCI may not have the overhead of unnecessary TPC command fields. In such cases, the DCI may not include TPC commands or can be configured (e.g., via RRC configuration) to not include TPC commands. In other words, the presence of TPC fields in the DCI can be configurable.

Figure 9:
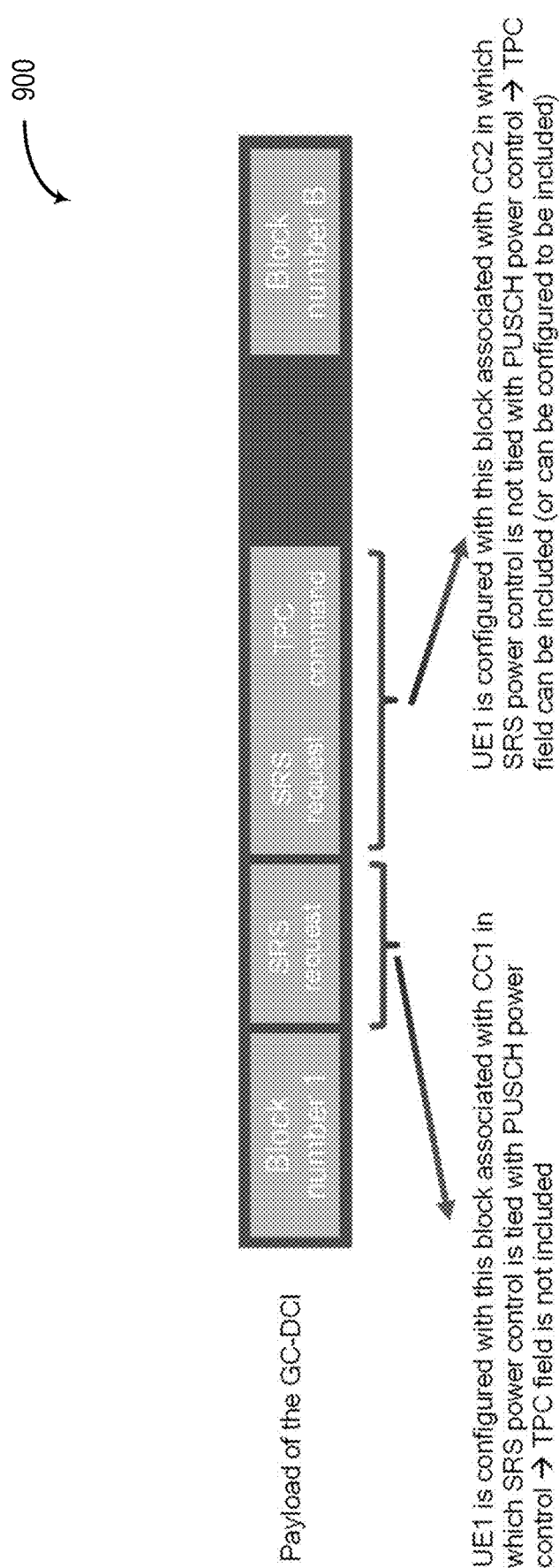
FIG. 9 depicts an example GC-DCI block format, in accordance with aspects of the present disclosure.

As illustrated in the example format 900 of FIG. 9, such configuration (the presence or absence of a TPC command) can be configured per UE and per CC (e.g., per block in the DCI). This is illustrated in the example of FIG. 9, where UE1 is configured with different blocks associated with different CCs, one of which has a TPC field while the other does not. As shown, UE1 is configured with a block associated with CC1 in which SRS power control is tied with PUSCH power control, thus a TPC field is not included in this block. UE1 is also configured with this block associated with CC2 in which SRS power control is not tied with PUSCH power control, thus a TPC field can be included (or can be configured to be included).

As another example property, in some cases, for a given UE, the DCI can trigger SRS transmission in CCs on which the SRS power control is tied with PUSCH power control. In such cases, the DCI does not include TPC commands for those CCs when SRS is requested on those CCs.

As another example of an enhanced property, certain GC-DCI formats presented herein may have flexible block sizes to accommodate for flexible SRS configurations.

Figure 10:
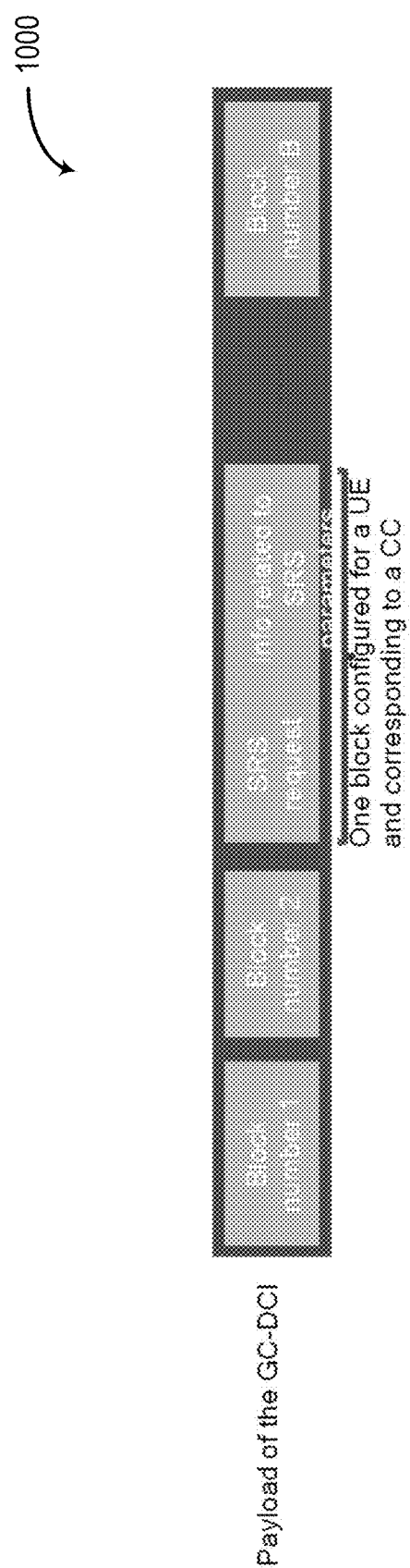
FIG. 10 depicts an example GC-DCI block format, in accordance with aspects of the present disclosure.

In such cases, as illustrated in the example format 1000 of FIG. 10, the size of each block of DCI payload may be configurable per UE and per CC, where the block indicates one or more parameters associated with the requested SRS resources or SRS resource sets. The illustrated example shows how one block may be configured for a UE and corresponding to a CC.

The parameters associated with a block can include a variety of different type parameters, such as time domain parameters, frequency domain parameters, spatial related parameters, and power related parameters. Time domain parameters may include parameters such as number of symbols and position within a slot, slot offset, and number of repetitions in one SRS resource. Frequency domain parameters may include SRS bandwidth and frequency hopping configurations. Spatial and power related parameters may include a number of SRS ports, power control parameters such as a TPC command, open loop parameters (P0, alpha, etc.), and spatial relation parameters (e.g., beam/TCI state).

The parameters may also include parameters related to the SRS sequence. These parameters may include, for example, Comb spacing, CombOffset, Cyclic shift, SRS sequence identity $n_{ID}^{SRS}$ (which determines sequence group u) or the value of u ($n_{ID}^{SRS}$ mod 30), and a sequence or group hopping configuration.

Figure 11A:
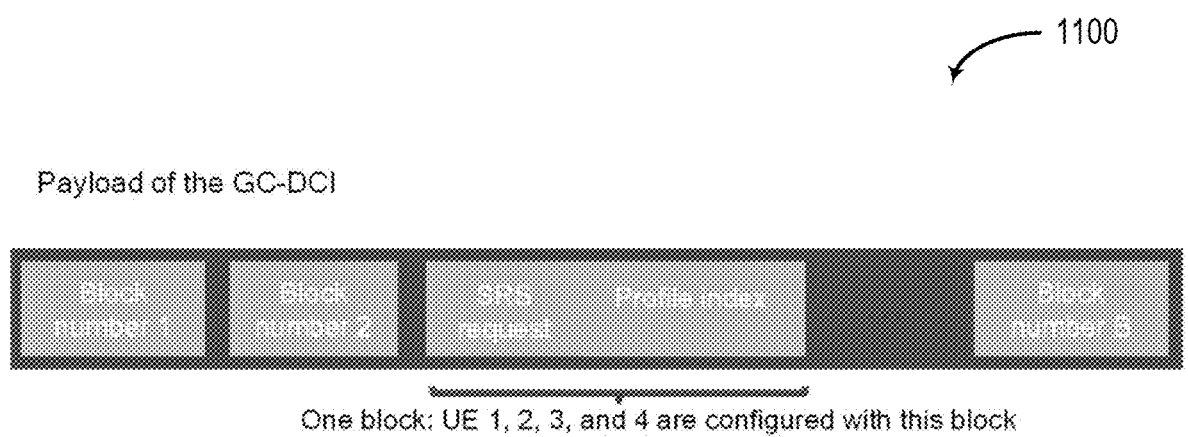
FIG. 11A and FIG. 11B depict an example deployment scenario and an example GC-DCI block format.

In some cases, instead of indicating the parameters directly, a set of profiles can be RRC-configured. As illustrated in FIG. 11A, in such cases, a DCI (e.g., a field within one block of the GC-DCI) may indicate an index associated with one profile. In some cases, the DCI can indicate some parameters directly and indicate other parameters via the profile index. In the example illustrated in FIG. 11A, one block configures parameters for 4 UEs: UE 1, 2, 3, and 4 shown in FIG. 11B.

As illustrated in FIGS. 12A-12D, each profile may be RRC-configured with a value for each of the parameters above and a profile index. In this manner, the network has can configure the number of profiles to control the tradeoff between flexibility and overhead.

Configuring profiles and indicating profile index in a block of the GC-DCI, in this manner, may be a preferred way, since this DCI is transmitted to multiple UEs, and (as in the example of FIG. 11A) one block may be shared among a subset of UEs (e.g., the same block is configured for the corresponding UEs to be monitored). Therefore, if different SRS parameters are needed for the subset of UEs (that share the same block) to ensure proper orthogonalization in symbol/RB/cyclic shift/base sequence domains, the same profile index field in the block can point to different SRS parameters through the corresponding RRC configurations of profiles for the different UEs.

Figure 11B:
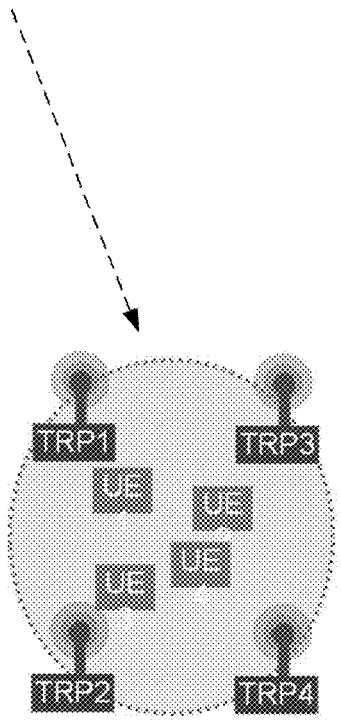

The example shown in FIGS. 11A and 11B, 4 UEs are grouped as a cluster (cluster size=4) for coherent joint transmission multi-user (CJT-MU) operation. For CJT-MU operation, SRS from each UE may need to be received at each TRP for joint precoding. Assuming that orthogonalization in RB/symbol/comb offset domains is not possible (or note desirable), in some cases, the cluster of UEs can be assigned different cyclic shifts and same base sequence (e.g. same $n_{ID}^{SRS}$) for proper orthogonalization (e.g., for this Profile index=2 may be indicated in the block). If different cyclic shifts are also not available, they can be assigned with different based sequences (e.g., for this Profile index=0 may be indicated in the block).

As another example of an enhanced property, certain GC-DCI formats presented herein may be used to trigger periodic SRS. In some cases, this may be accomplished by activating/de-activating periodic SRS transmission. For example, when the GC-DCI triggers/requests one or more SRS resource sets for a given UE (or UEs), the UE(s) may transmit the SRS resources within the SRS resource set periodically (e.g., based on configured periodicity) until another GC-DCI releases SRS transmissions.

This is different than existing AP-SRS behavior, where the SRS triggering is one-time request. As illustrated in the example format 1300 of FIG. 13, one field 1305 can be added to each block of the GC-DCI to indicate whether this is for activation or release of periodic SRS transmissions. The presence of this field can be RRC-configured for each block per UE. If some cases, if this field is not configured, the SRS trigger/request may be interpreted as a one-time SRS transmission.

Figure 13:
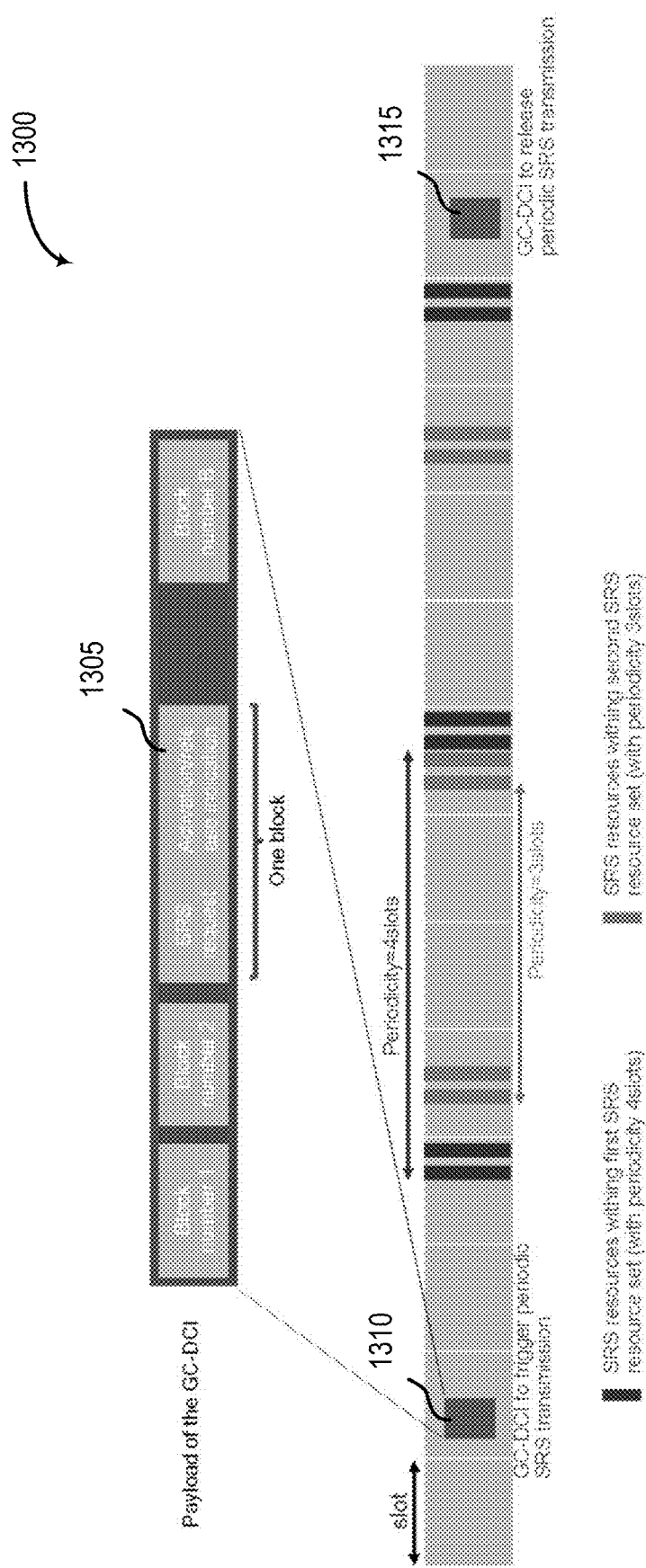
FIG. 13 depicts an example GC-DCI block format, in accordance with aspects of the present disclosure.

In the example shown in FIG. 13, a first GC-DCI 1310 triggers periodic SRS transmission. As illustrated a first set of SRS resources may be for periodic SRS transmission with a periodicity of 4 slots, while a second set of SRS resources may be for periodic SRS transmission with a periodicity of 3 slots. In the illustrated example, after two periodic transmissions, a second GC-DCI 1315 releases the periodic SRS transmission.

Example Operations of a User Equipment

Figure 14:
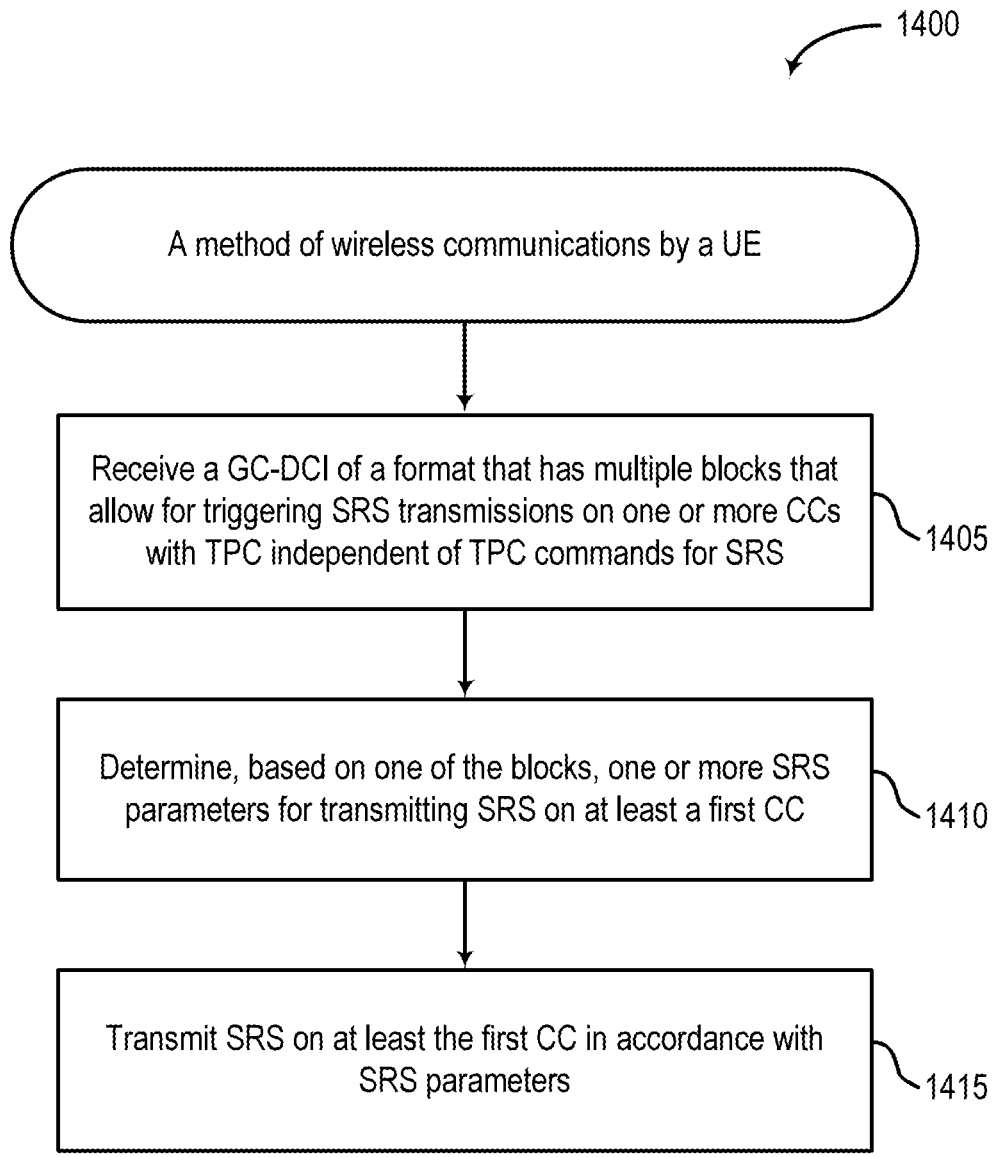
FIG. 14 depicts a method for wireless communications.

FIG. 14 shows a method 1400 for wireless communications by a UE, such as UE 104 of FIGS. 1 and 3.

Method 1400 begins at 1405 with receiving a GC-DCI of a format that has multiple blocks that allow for triggering SRS transmissions on one or more CCs with TPC independent of TPC commands for SRS. In some cases, the operations of this step refer to, or may be performed by, GC-DCI reception circuitry as described with reference to FIG. 16.

Method 1400 then proceeds to step 1410 with determining, based on one of the blocks, one or more SRS parameters for transmitting SRS on at least a first CC. In some cases, the operations of this step refer to, or may be performed by, SRS parameter processing circuitry as described with reference to FIG. 16.

Method 1400 then proceeds to step 1415 with transmitting SRS on at least the first CC in accordance with SRS parameters. In some cases, the operations of this step refer to, or may be performed by, SRS transmission circuitry as described with reference to FIG. 16.

In some aspects, each of the multiple blocks indicates one or more parameters associated with one or more SRS resource or SRS resource sets. In some aspects, the method 1400 further includes identifying the format of the GC-DCI based on a RNTI. In some aspects, the GC-DCI lacks TPC commands. In some aspects, the method 1400 further includes receiving RRC signaling configuring whether the GC-DCI includes TPC commands per block. In some aspects, the at least a first CC comprises a CC on which SRS power control is based on PUSCH power control; and transmitting SRS on at least the first CC comprises applying transmit power control based on the PUSCH power control.

In some aspects, a size of each of the blocks of the GC-DCI is configurable and indicates one or more parameters associated with one or more SRS resource or SRS resource sets. In some aspects, the one or more parameters comprise at least one of: time domain parameters, frequency domain parameters, spatial related parameters, power related parameters, or parameters related to an SRS sequence. In some aspects, the method 1400 further includes receiving RRC signaling indicating multiple profiles, each profile indicating one or more parameters comprise at least one of time domain parameters, frequency domain parameters, spatial related parameters, power related parameters, or parameters related to an SRS sequence; and wherein a field within the block indicates one of the profiles.

In some aspects, the GC-DCI activates periodic transmission of SRS by the UE. In some aspects, the UE periodically transmits SRS, according to a configured periodicity, until the UE receives another GC-DCI that terminates periodic transmission of SRS by the UE. In some aspects, activation and termination of periodic transmission of SRS are indicated via a field in the block. In some aspects, the field indicates whether the block is for activation or release of periodic transmission of SRS. In some aspects, the method 1400 further includes receiving RRC signaling configuring whether each block includes the field. In some aspects, the UE is configured to transmit a single SRS transmission if the RRC signaling does not configure the field in the block.

Figure 16:
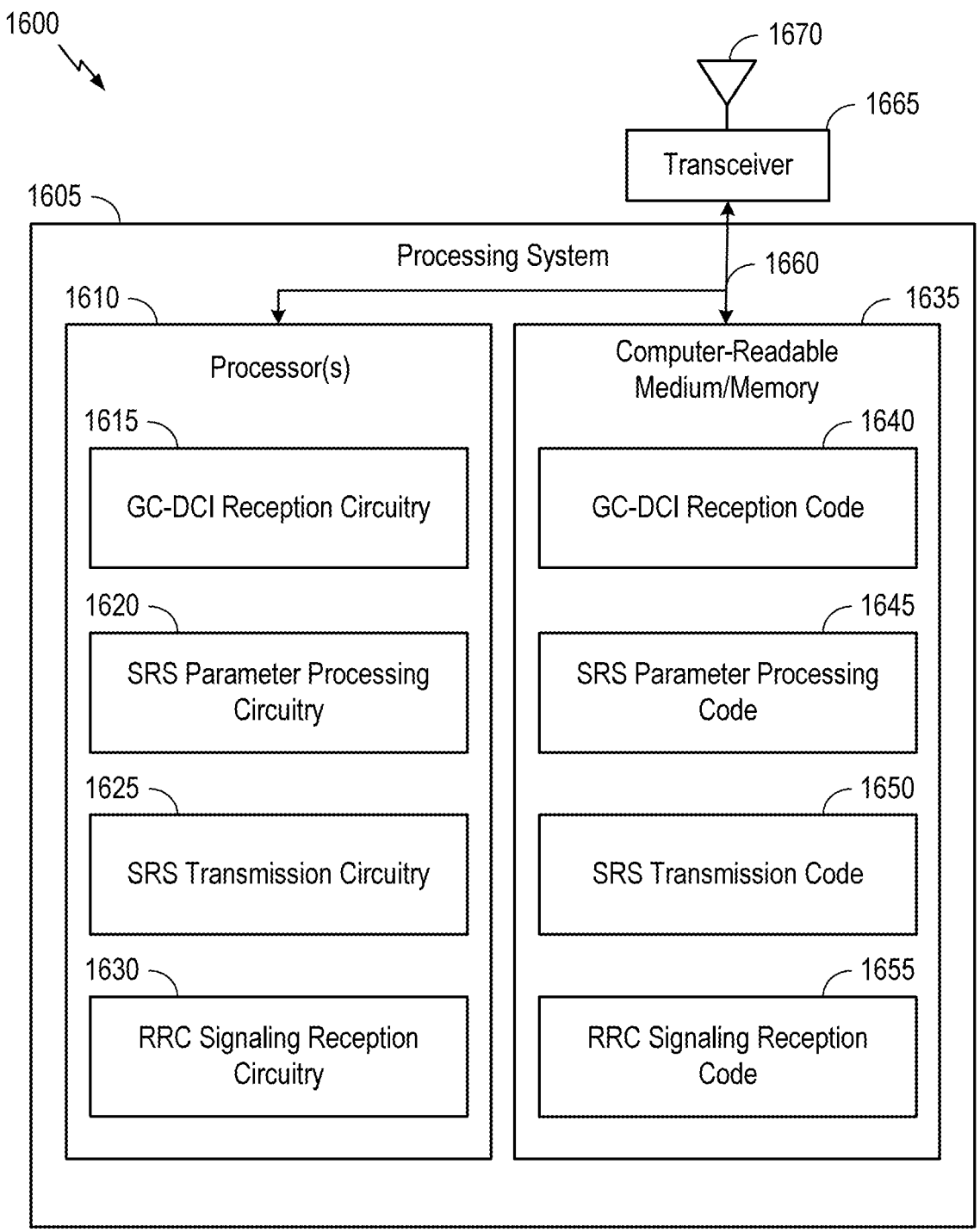
FIG. 16 depicts aspects of an example communications device.

In one aspect, method 1400, or any aspect related to it, may be performed by an apparatus, such as communications device 1600 of FIG. 16, which includes various components operable, configured, or adapted to perform the method 1400. Communications device 1600 is described below in further detail.

Note that FIG. 14 is just one example of a method, and other methods including fewer, additional, or alternative steps are possible consistent with this disclosure.

Example Operations of a Network Entity

Figure 15:
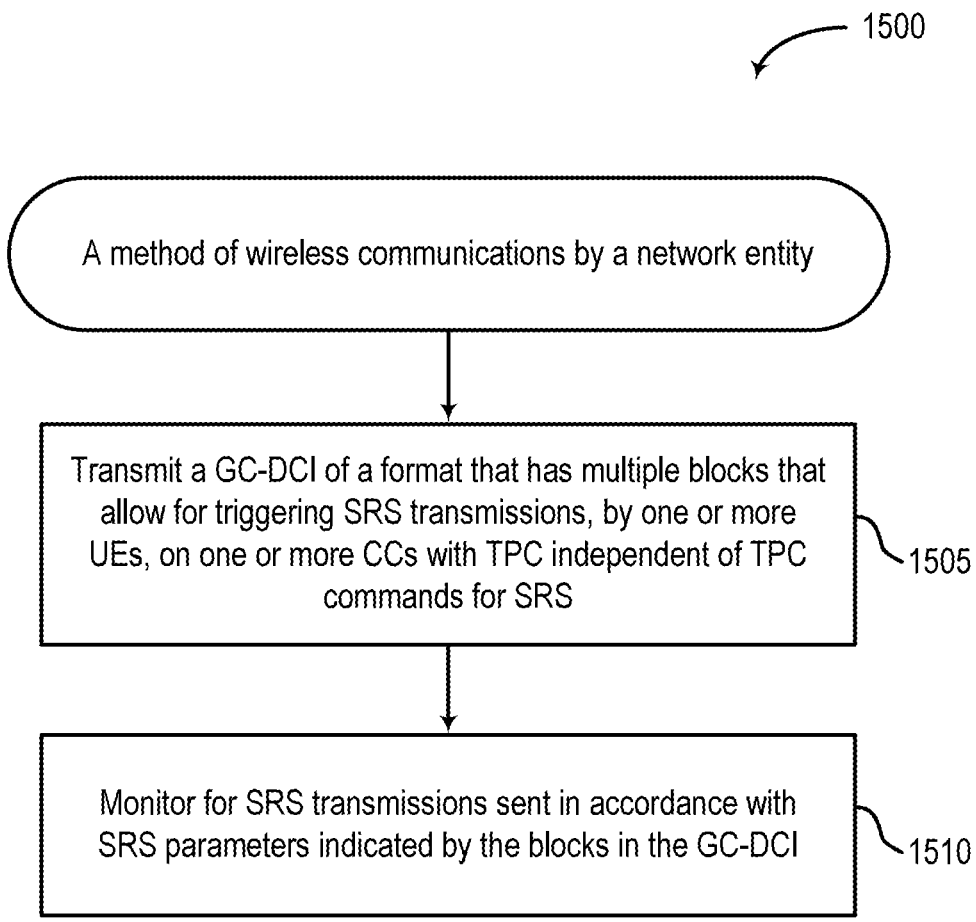
FIG. 15 depicts a method for wireless communications.

FIG. 15 shows a method 1500 for wireless communications by a network entity, such as BS 102 of FIGS. 1 and 3, or a disaggregated base station as discussed with respect to FIG. 2.

Method 1500 begins at 1505 with transmitting a GC-DCI of a format that has multiple blocks that allow for triggering SRS transmissions, by one or more UEs, on one or more CCs with TPC independent of TPC commands for SRS. In some cases, the operations of this step refer to, or may be performed by, GC-DCI transmission circuitry as described with reference to FIG. 17.

Method 1500 then proceeds to step 1510 with monitoring for SRS transmissions sent in accordance with SRS parameters indicated by the blocks in the GC-DCI. In some cases, the operations of this step refer to, or may be performed by, SRS monitoring circuitry as described with reference to FIG. 17.

In some aspects, each of the multiple blocks indicates one or more parameters associated with one or more SRS resource or SRS resource sets. In some aspects, the method 1500 further includes identifying the format of the GC-DCI based on a RNTI. In some aspects, the GC-DCI lacks TPC commands. In some aspects, the method 1500 further includes transmitting RRC signaling configuring whether the GC-DCI includes TPC commands per block. In some aspects, the at least a first CC comprises a CC on which SRS power control is based on PUSCH power control.

In some aspects, a size of each of the blocks of the GC-DCI is configurable and indicates one or more parameters associated with one or more SRS resource or SRS resource sets. In some aspects, the one or more parameters comprise at least one of: time domain parameters, frequency domain parameters, spatial related parameters, power related parameters, or parameters related to an SRS sequence.

In some aspects, the method 1500 further includes transmitting RRC signaling indicating multiple profiles, each profile indicating, for one or more of the UEs, one or more parameters comprise at least one of time domain parameters, frequency domain parameters, spatial related parameters, power related parameters, or parameters related to an SRS sequence; and wherein a field within one or more of the blocks indicates one of the profiles.

In some aspects, the GC-DCI activates periodic transmission of SRS by at least one of the UEs. In some aspects, the at least one of the UEs periodically transmits SRS, according to a configured periodicity, until the UE receives another GC-DCI that terminates periodic transmission of SRS by the UE. In some aspects, activation and termination of periodic transmission of SRS are indicated via a field in the block. In some aspects, the field indicates whether the block is for activation or release of periodic transmission of SRS. In some aspects, the method 1500 further includes transmitting RRC signaling configuring whether each block includes the field. In some aspects, the network entity is configured to monitor for a single SRS transmission from a UE, if the RRC signaling does not configure the field in the block for that UE.

Figure 17:
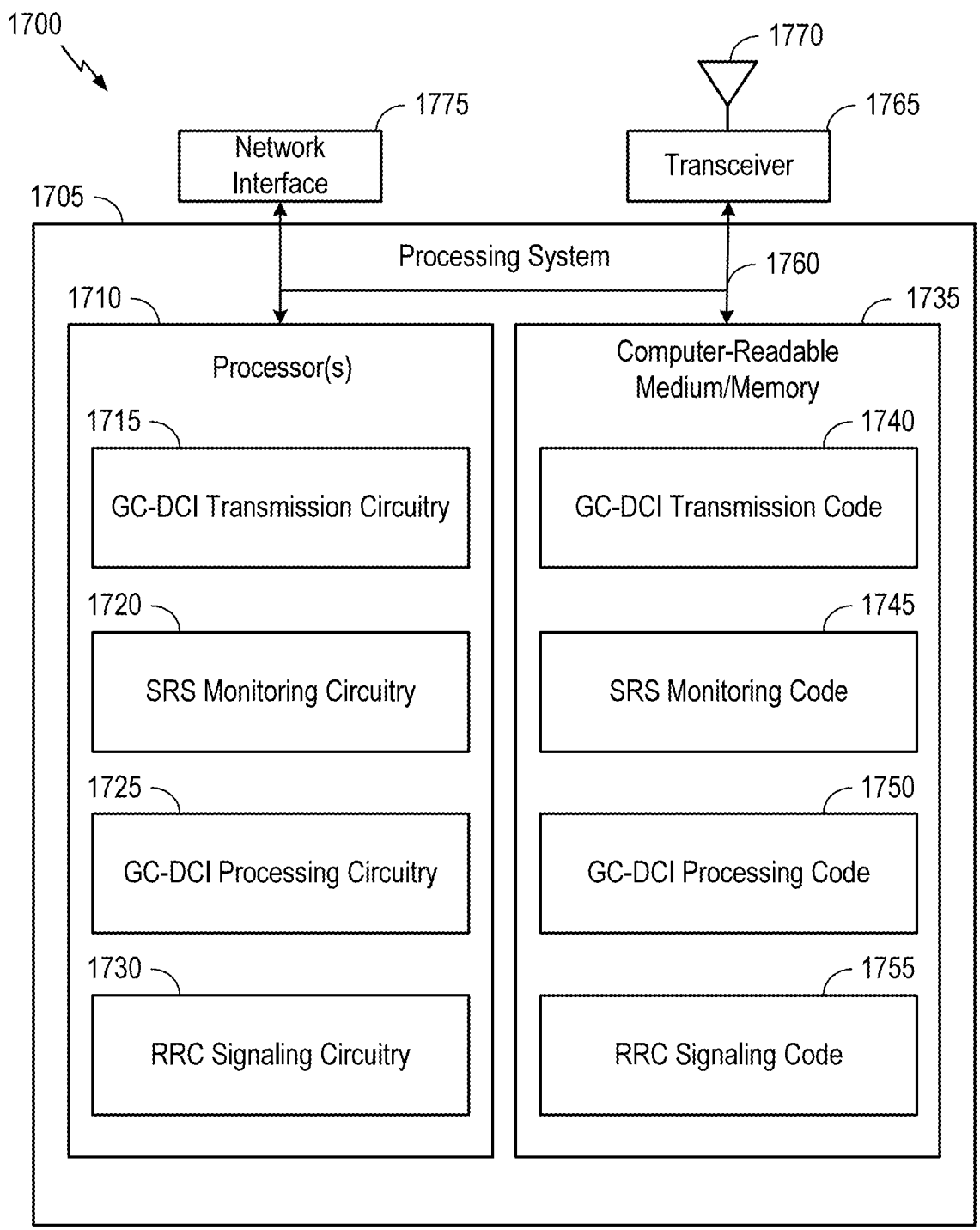
FIG. 17 depicts aspects of an example communications device.

In one aspect, method 1500, or any aspect related to it, may be performed by an apparatus, such as communications device 1700 of FIG. 17, which includes various components operable, configured, or adapted to perform the method 1500. Communications device 1700 is described below in further detail.

Note that FIG. 15 is just one example of a method, and other methods including fewer, additional, or alternative steps are possible consistent with this disclosure.

Example Communications Devices

FIG. 16 depicts aspects of an example communications device 1600. In some aspects, communications device 1600 is a user equipment, such as UE 104 described above with respect to FIGS. 1 and 3.

The communications device 1600 includes a processing system 1605 coupled to the transceiver 1665 (e.g., a transmitter and/or a receiver). The transceiver 1665 is configured to transmit and receive signals for the communications device 1600 via the antenna 1670, such as the various signals as described herein. The processing system 1605 may be configured to perform processing functions for the communications device 1600, including processing signals received and/or to be transmitted by the communications device 1600.

The processing system 1605 includes one or more processors 1610. In various aspects, the one or more processors 1610 may be representative of one or more of receive processor 358, transmit processor 364, TX MIMO processor 366, and/or controller/processor 380, as described with respect to FIG. 3. The one or more processors 1610 are coupled to a computer-readable medium/memory 1635 via a bus 1660. In certain aspects, the computer-readable medium/memory 1635 is configured to store instructions (e.g., computer-executable code) that when executed by the one or more processors 1610, cause the one or more processors 1610 to perform the method 1400 described with respect to FIG. 14, or any aspect related to it. Note that reference to a processor performing a function of communications device 1600 may include one or more processors 1610 performing that function of communications device 1600.

In the depicted example, computer-readable medium/memory 1635 stores code (e.g., executable instructions), such as GC-DCI reception code 1640, SRS parameter processing code 1645, SRS transmission code 1650, and RRC signaling reception code 1655. Processing of the GC-DCI reception code 1640, SRS parameter processing code 1645, SRS transmission code 1650, and RRC signaling reception code 1655 may cause the communications device 1600 to perform the method 1400 described with respect to FIG. 14, or any aspect related to it.

The one or more processors 1610 include circuitry configured to implement (e.g., execute) the code stored in the computer-readable medium/memory 1635, including circuitry such as GC-DCI reception circuitry 1615, SRS parameter processing circuitry 1620, SRS transmission circuitry 1625, and RRC signaling reception circuitry 1630. Processing with GC-DCI reception circuitry 1615, SRS parameter processing circuitry 1620, SRS transmission circuitry 1625, and RRC signaling reception circuitry 1630 may cause the communications device 1600 to perform the method 1400 described with respect to FIG. 14, or any aspect related to it.

Various components of the communications device 1600 may provide means for performing the method 1400 described with respect to FIG. 14, or any aspect related to it. For example, means for transmitting, sending or outputting for transmission may include transceivers 354 and/or antenna(s) 352 of the UE 104 illustrated in FIG. 3 and/or the transceiver 1665 and the antenna 1670 of the communications device 1600 in FIG. 16. Means for receiving or obtaining may include transceivers 354 and/or antenna(s) 352 of the UE 104 illustrated in FIG. 3 and/or the transceiver 1665 and the antenna 1670 of the communications device 1600 in FIG. 16.

According to some aspects, GC-DCI reception circuitry 1615 receives a GC-DCI of a format that has multiple blocks that allow for triggering SRS transmissions on one or more CCs with TPC independent of TPC commands for SRS. According to some aspects, SRS parameter processing circuitry 1620 determines, based on one of the blocks, one or more SRS parameters for transmitting SRS on at least a first CC. According to some aspects, SRS transmission circuitry 1625 transmits SRS on at least the first CC in accordance with SRS parameters.

In some aspects, each of the multiple blocks indicates one or more parameters associated with one or more SRS resource or SRS resource sets. In some examples, GC-DCI reception circuitry 1615 identifies the format of the GC-DCI based on a RNTI. In some aspects, the GC-DCI lacks TPC commands.

According to some aspects, RRC signaling reception circuitry 1630 receives RRC signaling configuring whether the GC-DCI includes TPC commands per block. In some aspects, the at least a first CC comprises a CC on which SRS power control is based on PUSCH power control; and transmitting SRS on at least the first CC comprises applying transmit power control based on the PUSCH power control. In some aspects, a size of each of the blocks of the GC-DCI is configurable and indicates one or more parameters associated with one or more SRS resource or SRS resource sets. In some aspects, the one or more parameters comprise at least one of: time domain parameters, frequency domain parameters, spatial related parameters, power related parameters, or parameters related to an SRS sequence.

In some examples, RRC signaling reception circuitry 1630 receives RRC signaling indicating multiple profiles, each profile indicating one or more parameters comprise at least one of time domain parameters, frequency domain parameters, spatial related parameters, power related parameters, or parameters related to an SRS sequence. In some aspects, a field within the block indicates one of the profiles.

In some aspects, the GC-DCI activates periodic transmission of SRS by the UE. In some aspects, the UE periodically transmits SRS, according to a configured periodicity, until the UE receives another GC-DCI that terminates periodic transmission of SRS by the UE. In some aspects, activation and termination of periodic transmission of SRS are indicated via a field in the block. In some aspects, the field indicates whether the block is for activation or release of periodic transmission of SRS. In some examples, RRC signaling reception circuitry 1630 receives RRC signaling configuring whether each block includes the field. In some aspects, the UE is configured to transmit a single SRS transmission if the RRC signaling does not configure the field in the block.

FIG. 17 depicts aspects of an example communications device 1700. In some aspects, communications device 1700 is a network entity, such as BS 102 of FIGS. 1 and 3, or a disaggregated base station as discussed with respect to FIG. 2.

The communications device 1700 includes a processing system 1705 coupled to the transceiver 1765 (e.g., a transmitter and/or a receiver) and/or a network interface 1775. The transceiver 1765 is configured to transmit and receive signals for the communications device 1700 via the antenna 1770, such as the various signals as described herein. The network interface 1775 is configured to obtain and send signals for the communications device 1700 via communication link(s), such as a backhaul link, midhaul link, and/or fronthaul link as described herein, such as with respect to FIG. 2. The processing system 1705 may be configured to perform processing functions for the communications device 1700, including processing signals received and/or to be transmitted by the communications device 1700.

The processing system 1705 includes one or more processors 1710. In various aspects, one or more processors 1710 may be representative of one or more of receive processor 338, transmit processor 320, TX MIMO processor 330, and/or controller/processor 340, as described with respect to FIG. 3. The one or more processors 1710 are coupled to a computer-readable medium/memory 1735 via a bus 1760. In certain aspects, the computer-readable medium/memory 1735 is configured to store instructions (e.g., computer-executable code) that when executed by the one or more processors 1710, cause the one or more processors 1710 to perform the method 1500 described with respect to FIG. 15, or any aspect related to it. Note that reference to a processor of communications device 1700 performing a function may include one or more processors 1710 of communications device 1700 performing that function.

In the depicted example, the computer-readable medium/memory 1735 stores code (e.g., executable instructions), such as GC-DCI transmission code 1740, SRS monitoring code 1745, GC-DCI processing code 1750, and RRC signaling code 1755. Processing of the GC-DCI transmission code 1740, SRS monitoring code 1745, GC-DCI processing code 1750, and RRC signaling code 1755 may cause the communications device 1700 to perform the method 1500 described with respect to FIG. 15, or any aspect related to it.

The one or more processors 1710 include circuitry configured to implement (e.g., execute) the code stored in the computer-readable medium/memory 1735, including circuitry such as GC-DCI transmission circuitry 1715, SRS monitoring circuitry 1720, GC-DCI processing circuitry 1725, and RRC signaling circuitry 1730. Processing with GC-DCI transmission circuitry 1715, SRS monitoring circuitry 1720, GC-DCI processing circuitry 1725, and RRC signaling circuitry 1730 may cause the communications device 1700 to perform the method 1500 as described with respect to FIG. 15, or any aspect related to it.

Various components of the communications device 1700 may provide means for performing the method 1500 as described with respect to FIG. 15, or any aspect related to it. Means for transmitting, sending or outputting for transmission may include transceivers 332 and/or antenna(s) 334 of the BS 102 illustrated in FIG. 3 and/or the transceiver 1765 and the antenna 1770 of the communications device 1700 in FIG. 17. Means for receiving or obtaining may include transceivers 332 and/or antenna(s) 334 of the BS 102 illustrated in FIG. 3 and/or the transceiver 1765 and the antenna 1770 of the communications device 1700 in FIG. 17.

According to some aspects, GC-DCI transmission circuitry 1715 transmits a GC-DCI of a format that has multiple blocks that allow for triggering SRS transmissions, by one or more UEs, on one or more CCs with TPC independent of TPC commands for SRS. According to some aspects, SRS monitoring circuitry 1720 monitors for SRS transmissions sent in accordance with SRS parameters indicated by the blocks in the GC-DCI.

In some aspects, each of the multiple blocks indicates one or more parameters associated with one or more SRS resource or SRS resource sets.

According to some aspects, GC-DCI processing circuitry 1725 identifies the format of the GC-DCI based on a RNTI. In some aspects, the GC-DCI lacks TPC commands.

According to some aspects, RRC signaling circuitry 1730 transmits RRC signaling configuring whether the GC-DCI includes TPC commands per block. In some aspects, the at least a first CC comprises a CC on which SRS power control is based on PUSCH power control. In some aspects, a size of each of the blocks of the GC-DCI is configurable and indicates one or more parameters associated with one or more SRS resource or SRS resource sets. In some aspects, the one or more parameters comprise at least one of: time domain parameters, frequency domain parameters, spatial related parameters, power related parameters, or parameters related to an SRS sequence.

In some examples, RRC signaling circuitry 1730 transmits RRC signaling indicating multiple profiles, each profile indicating, for one or more of the UEs, one or more parameters comprise at least one of time domain parameters, frequency domain parameters, spatial related parameters, power related parameters, or parameters related to an SRS sequence. In some aspects, a field within one or more of the blocks indicates one of the profiles. In some aspects, the GC-DCI activates periodic transmission of SRS by at least one of the UEs. In some aspects, the at least one of the UEs periodically transmits SRS, according to a configured periodicity, until the UE receives another GC-DCI that terminates periodic transmission of SRS by the UE. In some aspects, activation and termination of periodic transmission of SRS are indicated via a field in the block. In some aspects, the field indicates whether the block is for activation or release of periodic transmission of SRS.

In some examples, RRC signaling circuitry 1730 transmits RRC signaling configuring whether each block includes the field. In some aspects, the network entity is configured to monitor for a single SRS transmission from a UE, if the RRC signaling does not configure the field in the block for that UE.

Example Clauses

Implementation examples are described in the following numbered clauses:

Clause 1: A method for wireless communications by a UE, comprising: receiving a GC-DCI of a format that has multiple blocks that allow for triggering SRS transmissions on one or more CCs with TPC independent of TPC commands for SRS; determining, based on one of the blocks, one or more SRS parameters for transmitting SRS on at least a first CC; and transmitting SRS on at least the first CC in accordance with SRS parameters.

Clause 2: The method of Clause 1, wherein each of the multiple blocks indicates one or more parameters associated with one or more SRS resource or SRS resource sets.

Clause 3: The method of any one of Clauses 1 and 2, further comprising: identifying the format of the GC-DCI based on a RNTI.

Clause 4: The method of any one of Clauses 1-3, wherein the GC-DCI lacks TPC commands.

Clause 5: The method of any one of Clauses 1-4, further comprising: receiving RRC signaling configuring whether the GC-DCI includes TPC commands per block.

Clause 6: The method of any one of Clauses 1-5, wherein: the at least a first CC comprises a CC on which SRS power control is based on PUSCH power control; and transmitting SRS on at least the first CC comprises applying transmit power control based on the PUSCH power control.

Clause 7: The method of any one of Clauses 1-6, wherein a size of each of the blocks of the GC-DCI is configurable and indicates one or more parameters associated with one or more SRS resource or SRS resource sets.

Clause 8: The method of Clause 7, wherein the one or more parameters comprise at least one of: time domain parameters, frequency domain parameters, spatial related parameters, power related parameters, or parameters related to an SRS sequence.

Clause 9: The method of Clause 7, the method further comprising: receiving RRC signaling indicating multiple profiles, each profile indicating one or more parameters comprise at least one of time domain parameters, frequency domain parameters, spatial related parameters, power related parameters, or parameters related to an SRS sequence; and wherein a field within the block indicates one of the profiles.

Clause 10: The method of any one of Clauses 1-9, wherein the GC-DCI activates periodic transmission of SRS by the UE.

Clause 11: The method of Clause 10, wherein the UE periodically transmits SRS, according to a configured periodicity, until the UE receives another GC-DCI that terminates periodic transmission of SRS by the UE.

Clause 12: The method of Clause 11, wherein activation and termination of periodic transmission of SRS are indicated via a field in the block.

Clause 13: The method of Clause 12, wherein the field indicates whether the block is for activation or release of periodic transmission of SRS.

Clause 14: The method of Clause 13, further comprising: receiving RRC signaling configuring whether each block includes the field.

Clause 15: The method of Clause 14, wherein the UE is configured to transmit a single SRS transmission if the RRC signaling does not configure the field in the block.

Clause 16: A method for wireless communications by a network entity, comprising: transmitting a GC-DCI of a format that has multiple blocks that allow for triggering SRS transmissions, by one or more UEs, on one or more CCs with TPC independent of TPC commands for SRS; and monitoring for SRS transmissions sent in accordance with SRS parameters indicated by the blocks in the GC-DCI.

Clause 17: The method of Clause 16, wherein each of the multiple blocks indicates one or more parameters associated with one or more SRS resource or SRS resource sets.

Clause 18: The method of any one of Clauses 16 and 17, further comprising: identifying the format of the GC-DCI based on a RNTI.

Clause 19: The method of any one of Clauses 16-18, wherein the GC-DCI lacks TPC commands.

Clause 20: The method of any one of Clauses 16-19, further comprising: transmitting RRC signaling configuring whether the GC-DCI includes TPC commands per block.

Clause 21: The method of any one of Clauses 16-20, wherein at least a first CC comprises a CC on which SRS power control is based on PUSCH power control.

Clause 22: The method of any one of Clauses 16-21, wherein a size of each of the blocks of the GC-DCI is configurable and indicates one or more parameters associated with one or more SRS resource or SRS resource sets.

Clause 23: The method of Clause 22, wherein the one or more parameters comprise at least one of: time domain parameters, frequency domain parameters, spatial related parameters, power related parameters, or parameters related to an SRS sequence.

Clause 24: The method of Clause 22, further comprising: transmitting RRC signaling indicating multiple profiles, each profile indicating, for one or more of the UEs, one or more parameters comprise at least one of time domain parameters, frequency domain parameters, spatial related parameters, power related parameters, or parameters related to an SRS sequence; and wherein a field within one or more of the blocks indicates one of the profiles.

Clause 25: The method of any one of Clauses 16-24, wherein the GC-DCI activates periodic transmission of SRS by at least one of the UEs.

Clause 26: The method of Clause 25, wherein the at least one of the UEs periodically transmits SRS, according to a configured periodicity, until the UE receives another GC-DCI that terminates periodic transmission of SRS by the UE.

Clause 27: The method of Clause 26, wherein activation and termination of periodic transmission of SRS are indicated via a field in the block.

Clause 28: The method of Clause 27, wherein the field indicates whether the block is for activation or release of periodic transmission of SRS.

Clause 29: The method of Clause 28, further comprising: transmitting RRC signaling configuring whether each block includes the field.

Clause 30: The method of Clause 29, wherein the network entity is configured to monitor for a single SRS transmission from a UE, if the RRC signaling does not configure the field in the block for that UE.

Clause 31: A processing system, comprising: a memory comprising computer-executable instructions; one or more processors configured to execute the computer-executable instructions and cause the processing system to perform a method in accordance with any one of Clauses 1-30.

Clause 32: A processing system, comprising means for performing a method in accordance with any one of Clauses 1-30.

Clause 33: A non-transitory computer-readable medium comprising computer-executable instructions that, when executed by one or more processors of a processing system, cause the processing system to perform a method in accordance with any one of Clauses 1-30.

Clause 34: A computer program product embodied on a computer-readable storage medium comprising code for performing a method in accordance with any one of Clauses 1-30.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), comprising:
    receiving a group-common downlink control information (GC-DCI) of a format that has multiple blocks that allow for triggering sounding reference signal (SRS) transmissions on one or more component carriers (CCs) with transmit power control (TPC) independent of TPC commands for SRS, wherein at least a first block of the multiple blocks in the GC-DCI includes a field comprising a profile index indicating an SRS configuration profile of a set of radio resource control (RRC)-configured SRS configuration profiles;
    determining, based on the profile index and the set of RRC-configured SRS configuration profiles, the SRS configuration profile and a corresponding set of one or more SRS parameters for transmitting SRS on at least a first CC; and
    transmitting SRS on at least the first CC in accordance with SRS parameters.

2. The method of claim 1, further comprising identifying the format of the GC-DCI based on a radio network temporary identifier (RNTI).

3. The method of claim 1, wherein the GC-DCI lacks TPC commands.

4. The method of claim 1, further comprising receiving RRC signaling configuring whether the GC-DCI includes TPC commands per block.

5. The method of claim 1, wherein:
    at least the first CC comprises a CC on which SRS power control is based on PUSCH power control; and
    transmitting SRS on at least the first CC comprises applying transmit power control based on the PUSCH power control.

6. The method of claim 1, wherein a size of each of the blocks of the GC-DCI is configurable.

7. The method of claim 6, wherein the set of one or more parameters comprise at least one of:
    time domain parameters, frequency domain parameters, spatial related parameters, power related parameters, or parameters related to an SRS sequence.

8. The method of claim 6, further comprising:
    receiving RRC signaling indicating the set of RRC-configured SRS configuration profiles.

9. The method of claim 1, wherein: the GC-DCI activates periodic transmission of SRS by the UE.

10. The method of claim 9, wherein transmitting the SRS comprises periodically transmitting the SRS, according to a configured periodicity, until another GC-DCI is received that terminates the periodic transmission of SRS.

11. The method of claim 10, wherein activation and termination of periodic transmission of SRS are indicated via a field in the block.

12. The method of claim 11, wherein the field indicates whether the block is for activation or release of periodic transmission of SRS.

13. The method of claim 12, further comprising receiving RRC signaling configuring whether each block includes the field.

14. The method of claim 13, wherein transmitting the SRS comprises transmitting a single SRS transmission if the RRC signaling does not configure the field in the block.

15. A method for wireless communications by a network entity, comprising:
    transmitting a group-common downlink control information (GC-DCI) of a format that has multiple blocks that allow for triggering sounding reference signal (SRS) transmissions, by one or more user equipments (UEs), on one or more component carriers (CCs) with transmit power control (TPC) independent of TPC commands for SRS, wherein at least a first block of the multiple blocks in the GC-DCI includes a field comprising a profile index indicating an SRS configuration profile of a set of radio resource control (RRC)-configured SRS configuration profiles; and
    monitoring for SRS transmissions sent in accordance with at least a set of one or more SRS parameters corresponding to the SRS configuration profile indicated by the profile index.

16. The method of claim 15, further comprising identifying the format of the GC-DCI based on a radio network temporary identifier (RNTI).

17. The method of claim 15, wherein the GC-DCI lacks TPC commands.

18. The method of claim 15, further comprising transmitting RRC signaling configuring whether the GC-DCI includes TPC commands per block.

19. The method of claim 15, wherein:
at least the first CC comprises a CC on which SRS power control is based on PUSCH power control.

20. The method of claim 15, wherein a size of each of the blocks of the GC-DCI is configurable.

21. The method of claim 20, wherein the set of one or more parameters comprise at least one of:
time domain parameters, frequency domain parameters, spatial related parameters, power related parameters, or parameters related to an SRS sequence.

22. The method of claim 20, further comprising:
transmitting RRC signaling indicating the set of RRC-configured SRS configuration profiles.

23. The method of claim 15, wherein: the GC-DCI activates periodic transmission of SRS by at least one of the UEs.

24. The method of claim 23, wherein activation and termination of periodic transmission of SRS are indicated via a field in the block.

25. The method of claim 24, wherein the field indicates whether the block is for activation or release of periodic transmission of SRS.

26. The method of claim 25, further comprising transmitting RRC signaling configuring whether each block includes the field.

27. The method of claim 26, wherein monitoring for the SRS transmissions comprises monitoring for a single SRS transmission from a UE, if the RRC signaling does not configure the field in the block for that UE.

\* \* \* \* \*